Patented June 6, 1950

2,510,491

UNITED STATES PATENT OFFICE 2,510,491

CYCLOHEXENES DISUBSTITUTED IN THE 4-POSITION BY CYANO OR CARBAMYL GROUPS

Alan E. Ardis, Akron, Ohio, assignor to The B. F. Goodrich Company, New York, N. Y., a corporation of New York No Drawing. Application February 7, 1948, Serial No. 6,999

4 Claims. (Cl. 260—464)

This invention relates to a method for the preparation of vinylidene cyanide which method involves the pyrolysis of certain 4,4-disubstituted cyclohexenes.

I have discovered that vinylidene cyanide (also known as 1,1-dicyano ethylene), a liquid compound of the formula

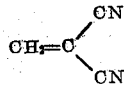

when present in monomeric form, may be readily prepared in excellent yields by the pyrolysis of disubstituted cyclohexenes of the formula

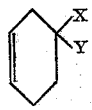

wherein each of X and Y is selected from the class consisting of —CN and —CONH$_2$ radicals, X and Y being the same or different.

The 4,4-disubstituted cyclohexenes which are pyrolyzed to obtain vinylidene cyanide in accordance with this invention have not heretofore been prepared but may be obtained in a variety of ways. One method of arriving at compounds in which X and Y are the same consists in reacting 4,4-dicarboxy cyclohexene, a known compound, with thionyl chloride or other substance which will replace the hydroxyl hydrogen atoms with chlorine, and then reacting the 4,4-cyclohexene dicarbonyl chloride thus formed with ammonia. The new compound wherein X and Y are both

i. e., 4,4-dicarbamyl cyclohexene, is thereby obtained. From this diamide the dinitrile, 4,4-dicyano cyclohexene, the new compound wherein both of X and Y are —CN, is obtained simply by dehydration in the usual manner.

The new compound wherein X and Y are different, that is, 4-cyano-4-carbamyl cyclohexene, may be prepared, for example, by reacting butadiene-1,3 with an alkyl ester of alpha cyano acrylic acid (the preparation of which is disclosed in my copending applications, Serial No. 731,863, filed March 1, 1947 now Patent No. 2,467,926, and Serial No. 751,471 filed May 29, 1947, now Patent No. 2,467,927) to form a 4-cyano-4-carboalkoxy cyclohexene, also a new compound, and then converting the carboalkoxy group to the carbamyl group by reaction with ammonia, 4,4-dicyano cyclohexene is also obtainable by dehydrating the 4-cyano-4-carbamyl cyclohexene.

The reactions described above may be formulated as follows:

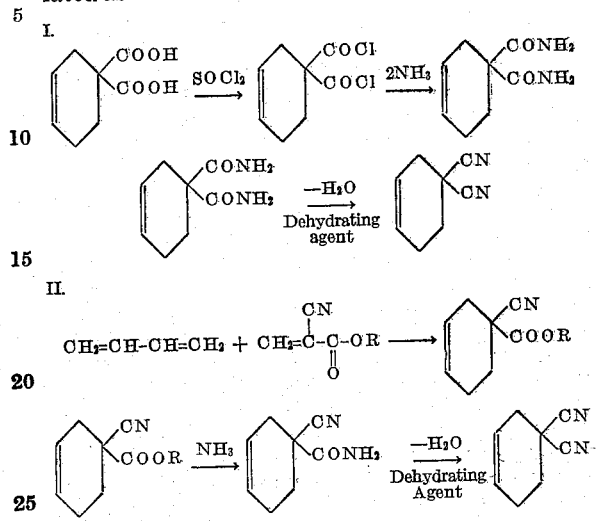

As disclosed hereinabove, vinylidene cyanide is obtained by the pyrolysis of any of the compounds of the general formula wherein X and Y have the meaning set forth hereinabove. Monomeric vinylidene cyanide is easiest obtained in highest yield when the compound pyrolyzed is 4,4-dicyano cyclohexene, although vinylidene cyanide may also be readily obtained in good yield by the pyrolysis of the other compounds of this formula.

The products of the pyrolysis reaction are vinylidene cyanide and butadiene-1,3. In addition to vinylidene cyanide and butadiene, water is also obtained when the starting compound is a disubstituted cyclohexene containing one or more carbamyl (—CONH$_2$) groups.

The pyrolysis reaction can be conducted in several different manners. For example, one method involves passing vapors of the 4,4-disubstituted cyclohexene through a heated metal tube, preferably brass, which is connected to a receiver, preferably provided with external cooling means so as to liquefy the pyrolysis product. Variations in this method involve the use of a glass pyrolysis tube instead of a metal tube, or pyrolyzing the starting material over a hot resistance wire. The pyrolysis reaction is preferably conducted at reduced pressures, and especially from 2 to 50 mm., although pressures up to and including atmospheric pressure are operative.

The temperature at which the pyrolysis is conducted may be varied widely. Temperatures in the range of 400° C. to 800° C. are operative with the preferred range being from 550° C. to 700° C.

The product of the pyrolysis, usually collected as a liquid, is a mixture of vinylidene cyanide, unreacted 4,4-disubstituted cyclohexene and butadiene, water also being present when the starting material contains one or more —$CONH_2$ groups. The vinylidene cyanide can be separated from the pyrolysis product by several methods. For example, a preferred method consists in evaporating off the volatile butadiene and fractionally distilling the remainder of the pyrolysis reaction mixture, preferably at reduced pressures, whereupon a fraction consisting substantially of vinylidene cyanide is obtained.

A second useful method consists in extracting the vinylidene cyanide from the reaction mixture by the use of a solvent, preferably one from which the vinylidene cyanide will crystallize. This is done, for example, by mixing the liquid product and a substance such as dry toluene or similar aromatic hydrocarbon, preferably in equal volumes, and cooling the mixture to a temperature of approximately —40° C. whereupon monomeric vinylidene cyanide separates from the liquid mixture in the form of crystals which are easily isolated, for example, by filtration. High yields of very pure vinylidene cyanide, in the monomeric form, are obtained by this method.

Vinylidene cyanide polymerizes quite rapidly in the presence of water to form a solid polymer. Consequently when water is present in the pyrolysis reaction mixture, vinylidene cyanide may be isolated by allowing polymerization to proceed and then separating the solid polymerized vinylidene cyanide from the other products by filtering or the like. The polymer may then be depolymerized by heating, preferably at 170° to 250° C., to obtain monomeric vinylidene cyanide.

When using other methods of separation, it is desirable that the vinylidene cyanide be stabilized against polymerization from the time that it is formed. This may be accomplished by using a suitable vinylidene cyanide stabilizer (that is, a polymerization inhibitor) which may be mixed with the 4,4-disubstituted cyclohexene prior to pyrolysis or placed in the receiver for the pyrolysis reaction product. Such a stabilizer is also preferably present in the receiver used to collect the vinylidene cyanide when it is separated by distillation. Suitable vinylidene cyanide stabilizers include phosphorus pentoxide and phosphorus pentasulfide, which are preferred, as well as antimony pentoxide, concentrated sulfuric acid and other materials reactive with water, since polymerization is catalyzed by even small amounts of hydroxyl ion. The stabilizer may be present in any desired amount but in general as little as 0.5 to 3.0% based on the amount of monomer is sufficient to prevent polymerization for extended periods of time.

The following examples are intended to illustrate the preparation of 4,4-disubstituted cyclohexenes and the pyrolysis of such compounds to vinylidene cyanide. It is not intended, however, to limit the invention thereto, for there are, of course, numerous modifications. All parts are by weight.

Example I 116 parts of 4,4-dicarboxy cyclohexene are refluxed for 63 hours with 650 parts of thionyl chloride. The unreacted thionyl chloride is removed by distilling at reduced pressure. The residue is then diluted with three times its volume of anhydrous ether and this solution added dropwise with stirring and cooling to a dry ether solution of ammonia. Additional ammonia is bubbled through the reaction mixture during the addition of the ethereal solution in order that an excess of ammonia can be maintained throughout the reaction. The solid which forms is filtered, washed with water and recrystallized from methanol. It is identified as 4,4-dicarbamyl cyclohexene (nitrogen analysis: theory 16.7%, found 16.3%) and is secured in substantially quantitative yield.

Example II 120 parts of 4,4-dicarbamyl cyclohexene, obtained as in Example I, are mixed with 189 parts of phosphorus pentoxide as a dehydrating agent, and the mixture fractionally distilled whereupon there is obtained 60 parts of a fraction (B. P. 66° C./1 mm.) which upon purification is identified as 4,4-dicyano cyclohexene (M. P. 36° C.; nitrogen analysis: theory 21.2%, found 20.1%).

Example III 4,4-dicyano cyclohexene, obtained as in Example II, is pyrolyzed by passing vapors thereof at 5 mm. pressure, over a nickel-chromium wire maintained at a temperature of 650° C., the pyrolysis reaction product being collected in a receiver which is cooled in an acetone Dry-Ice bath. The reaction product is allowed to warm up to room temperature and then distilled at a pressure of 5 mm. into a receiver containing a small amount of phosphorus pentoxide whereupon monomeric vinylidene cyanide (M. P. 8° C.; $n_D^{20}$ 1.440) is obtained in good yield.

Example IV

When 4,4-dicarbamyl cyclohexene as prepared in Example I is pyrolyzed as in Example II over a nickel-chromium wire at a temperature of 600° C. in the presence of phosphorus pentoxide, vinylidene cyanide is again obtained in substantial yield.

Example V 17 parts of ethyl-alpha-cyano acrylate, 10 parts of butadiene-1,3 and 0.1 part of hydroquinone as a polymerization inhibitor are placed in a glass reaction bomb and sealed. The bomb is then heated in a steam bath for two hours, after which the bomb is cooled, opened and the product distilled. 16 parts of 4-cyano-4-carbethoxy cyclohexene (B. P. 91°/1 mm., n=1.465) are obtained.

One mole of the 4-cyano-4-carbethoxy cyclohexene thus prepared is then treated with 1.2 moles of concentrated ammonium hydroxide. The solid thus formed is filtered, washed with a small amount of cold ethanol and then recrystallized from methanol. It is identified as 4-carbamyl-4-cyano cyclohexene (nitrogen analysis; theory 18.7%, found 18.8%).

Example VI 15 parts of 4-carbamyl-4-cyano cyclohexene prepared as in Example V are mixed with 20 parts of phosphorus pentoxide and sufficient tricresyl phosphate to give an intimate mixture. This mixture is then distilled giving a 64% yield of 4,4-dicyano cyclohexene (B. P. 66°/1 mm., 110°/11 mm.).

*Example VII*

26.5 parts of 4,4-dicyano cyclohexene are heated and the vapors passed at a temperature of 670° C. and a pressure of 9 mm. through a brass pyrolysis tube containing brass chain packing. The pyrolysis reaction product is then distilled at a pressure of 10 mm. whereupon 5.2 parts (56%) of monomeric vinylidene cyanide are obtained.

*Example VIII*

The pyrolysis of Example VII is repeated in the presence of 1 part of phosphorus pentoxide. Upon distillation of the reaction product at a pressure of 10 mm. a 58% yield of monomeric vinylidene cyanide (M. P. 8° C. $n=1.4440$) is obtained.

When 4-cyano-4-carbamyl-cyclohexene prepared as in Example V is pyrolyzed under the conditions set forth hereinabove and the reaction product distilled, vinylidene cyanide is also obtained as the principal product.

Vinylidene cyanide prepared by the method of this invention is very valuable for the preparation of polymers and copolymers suitable as synthetic rubbers, synthetic resins, and plastics. Furthermore, polymeric vinylidene cyanide and copolymers of vinylidene cyanide with other materials polymerizable therewith, may be spun into synthetic filaments which possess many valuable properties including great tensile strength, flexibility, and resistance to chemicals. Monomeric vinylidene cyanide, as well as the compounds from which it is obtained as disclosed herein, may also be used for insecticidal and fungicidal purposes as well as for many other uses.

Although specific examples are included herein, it is not intended to limit the invention thereto, for numerous modifications will be apparent to those skilled in the art, and are within the scope of the appended claims.

I claim:
1. A compound of the formula

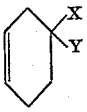

wherein X and Y are selected from the class consisting of —CN and —CONH$_2$ groups.

2. 4,4-dicyano cyclohexene of the formula

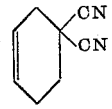

3. 4-cyano-4-carbamyl cyclohexene of the formula

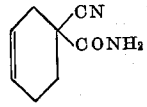

4. 4,4-dicarbamyl cyclohexene of the formula

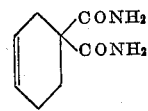

ALAN E. ARDIS.

REFERENCES CITED

The following references are of record in the file of this patent:

UNITED STATES PATENTS

| Number | Name | Date |
|---|---|---|
| 2,217,632 | Wolfe | Oct. 8, 1940 |
| 2,264,354 | Alder et al. | Dec. 2, 1941 |
| 2,385,552 | Spence et al. | Sept. 25, 1945 |
| 2,410,820 | Harris | Nov. 12, 1946 |
| 2,447,196 | Martin et al. | Aug. 17, 1948 |

OTHER REFERENCES

Ostling, Chem. Abstracts, vol. 15, page 2829 (1921).

Bachman et al., Chem. Abstracts, vol. 34, Cols. 380–381 (1940).

Gallagher, Chem. Abstracts, vol. 37, Col. 1997 (1943).